US 12,145,806 B2

(12) United States Patent
Yang et al.

(10) Patent No.: US 12,145,806 B2
(45) Date of Patent: Nov. 19, 2024

(54) CONVEYING SYSTEM

(71) Applicant: GUANGZHOU MINO EQUIPMENT CO., LTD., Guangzhou (CN)

(72) Inventors: Meng Yang, Guangzhou (CN); Bangchao Qiu, Guangzhou (CN); Kaidong Huang, Guangzhou (CN); Junhui Li, Guangzhou (CN); Qing Li, Guangzhou (CN); Zhencheng Chen, Guangzhou (CN)

(73) Assignee: GUANGZHOU MINO EQUIPMENT CO., LTD., Guangzhou (CN)

( * ) Notice: Subject to any disclaimer, the term of this patent is extended or adjusted under 35 U.S.C. 154(b) by 126 days.

(21) Appl. No.: 17/785,859

(22) PCT Filed: Dec. 29, 2020

(86) PCT No.: PCT/CN2020/140972
§ 371 (c)(1),
(2) Date: Jun. 15, 2022

(87) PCT Pub. No.: WO2021/121430
PCT Pub. Date: Jun. 24, 2021

(65) Prior Publication Data
US 2023/0348195 A1 Nov. 2, 2023

(30) Foreign Application Priority Data
Dec. 17, 2019 (CN) .......................... 201911298300.1

(51) Int. Cl.
*B65G 39/12* (2006.01)
*B65G 35/06* (2006.01)
*B65G 47/88* (2006.01)
(52) U.S. Cl.
CPC .................................. *B65G 39/12* (2013.01)

(58) Field of Classification Search
None
See application file for complete search history.

(56) References Cited

U.S. PATENT DOCUMENTS 6,189,672 B1   2/2001 Schut
10,947,046 B2* 3/2021 Fellner ................... B65G 61/00

FOREIGN PATENT DOCUMENTS

CN   201882558 U   6/2011
CN   201901409 U   7/2011
(Continued)

OTHER PUBLICATIONS

International Search Report, dated Mar. 30, 2021 for corresponding International Application No. PCT/CN2020/140972 with English translation (7 pages).

(Continued)

*Primary Examiner* — Kavel Singh
(74) *Attorney, Agent, or Firm* — Intellectual Property Law Group LLP

(57) ABSTRACT

A conveying system, comprising: a conveying carrier (3) that is provided with a first connection structure (31); a rolling bed (1) that comprises a rolling bed base (11) and a plurality of rolling components (12), wherein the rolling components (12) are connected to the rolling bed base (11); a driving mechanism comprising a second connection structure (26) and a driving assembly, wherein the driving assembly can drive the second connection structure (26) to reciprocate between a first position and a second position along a conveying direction, the second connection structure (26) at the first position is connected to the first connection structure (31), and the second connection structure (26) at the second position is separated from the first connection structure (31); and a positioning mechanism (4) comprising an X-direction positioning assembly, a Y-direction positioning assembly, and a Z-direction positioning assembly, (Continued)

wherein the Z-direction positioning assembly lifts the conveying carrier (3), so that the conveying carrier (3) is separated from the rolling component (12). The system can achieve ultra-high speed conveying, improve production takt, further ensure a production capacity, and reduce the cost.

8 Claims, 4 Drawing Sheets

(56) References Cited

FOREIGN PATENT DOCUMENTS

| | | |
|---|---|---|
| CN | 202729086 U | 2/2013 |
| CN | 103693400 A | 4/2014 |
| CN | 208882745 U | 5/2019 |
| CN | 111099251 A | 5/2020 |
| JP | 2009166936 A | 7/2009 |

OTHER PUBLICATIONS

Written Opinion of the ISA, dated Mar. 30, 2021 for corresponding International Application No. PCT/CN2020/140972 (4 pages).
Written Opinion of the ISA, dated Mar. 30, 2021 for corresponding International Application No. PCT/CN2020/140972 with English translation (9 pages).

* cited by examiner

CONVEYING SYSTEM

CROSS-REFERENCE TO RELATED APPLICATION

The present disclosure claims priority to Chinese Patent Application No. 201911298300.1, entitled "CONVEYING SYSTEM", filed on Dec. 17, 2019, the content of which is incorporated herein by reference in its entirety.

TECHNICAL FIELD

The present disclosure is applied in the field of conveying equipment, and particularly relates to a conveying system.

BACKGROUND

A conveying system is a key equipment that affects a production takt of a production line. A conveying speed directly affects the production takt. As one of a most widely used conveying equipment in a workshop, a roller bed trolley conveying system mostly relies on gravity to be abutted, and adopts a friction driving method for conveying, so that the conveying speed may be limited by a limit of friction force. When the speed reaches a certain level, a slip phenomenon is occurred, so that a higher speed cannot be reached. For a standard working station with a spacing of 6 meters, the maximum conveying takt can only reach about 5 seconds. At present, for positioning a trolley, generally, the trolley is placed on a positioning mechanism by lifting and lowering roller bed to realize the positioning, and the lifting movement takes about 3 seconds. The aforementioned problems limit the improvement of the production takt, which limits a production capacity of a manufacturer, or in order to ensure the production capacity, a plurality of production lines need to be built for production, such that the cost input is high.

SUMMARY

The purpose of the present disclosure is to solve at least one of the problems existing in the prior art, and to provide a conveying system, which can realize an ultra-high-speed conveying, improve a production takt, and further ensure a production capacity, and reduce a cost input.

The solutions adopted by the present disclosure to solve the technical problem are as follows.

A conveying system includes a conveying carrier provided with a first connection structure; a roller bed including a roller bed base and a plurality of rolling components, wherein the rolling components are connected to the roller bed base, and the rolling components support the conveying carrier; a driving mechanism including a second connection structure and a driving assembly, wherein the driving assembly is capable of driving the second connection structure to perform a reciprocating movement between a first position and a second position along a conveying direction, the second connection structure is connected to the first connection structure at the first position, and the second connection structure is separated from the first connection structure at the second position; and a positioning mechanism including an X-direction positioning assembly, a Y-direction positioning assembly and a Z-direction positioning assembly, wherein the X-direction positioning assembly is configured to position the conveying carrier at a working position in an X direction, the Y-direction positioning assembly is configured to position the conveying carrier at the working position in a Y direction, the Z-direction positioning assembly is configured to position the conveying carrier at the working position in a Z direction, and the Z-direction positioning assembly lifts the conveying carrier to disengage the conveying carrier from the rolling components.

Combined with the aforementioned implementations, in some implementations, the driving mechanism includes a first driving component, a driving pulley, a driven pulley and a synchronous belt. The driving pulley is connected to an output end of the first driving component, the driving pulley and the driven pulley are connected in a transmission manner via the synchronous belt, the synchronous belt extends along the conveying direction, and the second connection structure is connected to the synchronous belt.

Combined with the aforementioned implementations, in some implementations, the driven pulley includes a first driven pulley and a second driven pulley. The first driven pulley and the second driven pulley are arranged along the conveying direction and prop the synchronous belt open. The driving pulley is located between the first driven pulley and the second driven pulley, and auxiliary pulleys configured to guide the synchronous belt are provided on both sides of the driving pulley.

Combined with the aforementioned implementations, in some implementations, the first connection structure and the second connection structure have abutted surfaces that are cooperated with each other, and the abutted surfaces are V-shaped or cylindrical, such that the first connection structure and the second connection structure may move relative to each other along the Z direction.

Combined with the aforementioned implementations, in some implementations, the synchronous belt is provided with a second driving component, and the second driving component may drive the second connection structure to stretch out and draw back along the Y direction to be connected to or separated from the first connection structure.

Combined with the aforementioned implementations, in some implementations, the conveying system has a plurality of working positions along the conveying direction, a plurality sets of the driving mechanisms are arranged along the conveying direction, and conveying ranges of two adjacent sets of the driving mechanisms are partially overlapped.

Combined with the aforementioned implementations, in some implementations, the driving mechanism includes a sliding seat; a rack connected to the sliding seat and extending along the conveying direction; a mounting seat is cooperated with the sliding seat via a guiding assembly, wherein the second connection structure is connected to the mounting seat; and a third driving component connected to the mounting seat, wherein an output end of the third driving component is provided with a gear cooperated with the rack.

Combined with the aforementioned implementations, in some implementations, the first connection structure includes a pin hole, the second connection structure includes a pin, and further includes a fourth driving component. The fourth driving component is capable of driving the pin to stretch out and draw back in the Z direction to be connected to or separated from the pin hole.

Combined with the aforementioned implementations, in some implementations, the X-direction positioning assembly includes an X-direction positioning wheel defining an X-direction positioning slot in the conveying carrier; an X-direction positioning block; and a fifth driving component capable of driving the X-direction positioning block to extend into or retreat from the X-direction positioning slot.

Combined with the aforementioned implementations, in some implementations, the Y-direction positioning assembly includes a Y-direction positioning wheel and a Y-direction positioning block. The Y-direction positioning wheels are connected to the roller bed base and are arranged on both sides of the conveying carrier along the conveying direction. The Y-direction positioning block is connected to the conveying carrier to be cooperated with the Y-direction positioning wheel. The Z-direction positioning assembly includes a Z-direction positioning wheel and a Z-direction positioning block. The Z-direction positioning wheel is connected to the roller bed base and is arranged below the conveying carrier along the conveying direction. The Z-direction positioning block is connected to the conveying carrier to be cooperated with the Z-direction positioning wheel.

One of the aforementioned technical solutions has at least one of the following advantages or beneficial effects.

1. The driving mechanism and the conveying carrier are in rigid contact along the conveying direction, which may avoid the problem of the that the conveying speed cannot be further improved in the traditional friction driving method because of the limitation of the friction limit, and may increase the conveying takt for the standard working station with a spacing of 6 meters from about 5 seconds to about 3 seconds.

2. While maintaining the rigid contact between the driving mechanism and the conveying carrier, the driving mechanism and the conveying carrier may move relative to each other in a height direction. With the addition of the Z-direction positioning component, when the conveying carrier is conveyed to the working position, the conveying carrier may be automatically positioned in the Z direction, so that it is unnecessary to use the traditional lifting movement of the roller bed to achieve positioning, which saves the positioning time.

3. With the help of the combination of the aforementioned mechanisms, the ultra-high-speed conveying may be realized, and the conveying and positioning may be completed in about 3 seconds. The traditional method takes about 8 seconds at the fastest (5 seconds for conveying and 3 seconds for positioning). Compared with the existing technology, the conveying takt is greatly improved, which may increase the production capacity of automobile manufacturers, or reduce the number of production lines under the same production capacity, which saves costs and creates favorable conditions.

Additional aspects and advantages of the present disclosure will be set forth in part in the following description, and in part will be apparent from the following description, or may be learned by practice of the present disclosure.

BRIEF DESCRIPTION OF THE DRAWINGS

The aforementioned and/or additional aspects and advantages of the present disclosure will become apparent and readily understood from the following description of embodiments taken in conjunction with the accompanying drawings, wherein.

DETAILED DESCRIPTION OF THE EMBODIMENTS

This part will describe the specific embodiments of the present disclosure in detail, and the preferred embodiments of the present disclosure are shown in the accompanying drawings. The accompanying drawings is intended to supplement the description of the text part of the specification with graphics, such that people can intuitively and vividly understand each feature and the overall solution of the present disclosure, but they should not be construed as limiting the protection scope of the present disclosure.

In the present disclosure, if there is a description to the direction (up, down, left, right, front and rear), it is only for the convenience of describing the solution of the present disclosure, rather than indicating or implying that the features referred to must have specific orientation, be constructed and operated in a particular orientation, and therefore should not be construed as a limitation of the present disclosure.

In the present disclosure, "several" means one or more, "a plurality of" means two or more, "greater than", "less than", "exceeding", etc. are understood as not including the number; "above", "below" and "within"" etc. are understood to include the number. In the description of the present disclosure, if it is described as "first" or "second", it is only used for the purpose of distinguishing technical features, it should not be understood as indicating or implying relative importance or implying the number of indicated features or implicitly indicates the order of the indicated features.

In the present disclosure, unless otherwise clearly defined, terms such as "set", "mount" and "connect" should be understood in a broad sense, for example, it may be directly connected or indirectly connected via an intermediate medium; it may be a fixed connection or a detachable connection, or may also be integrally formed; it may be a mechanical connection or an electrical connection or may communicate with each other; it may be the internal communication between the two elements or the interaction relationship between the two elements. Those skilled in the art can reasonably determine the specific meanings of the aforementioned words in the present disclosure in combination with the specific content of the technical solutions.

FIG. 1 to FIG. 7 show a reference direction coordinate system of the embodiment of the present disclosure, and the following describes the embodiment of the present disclosure with reference to the directions shown in FIG. 1 to FIG. 7.

An embodiment of the present disclosure provides a conveying system including a conveying carrier 3, a roller bed 1, a driving mechanism and a positioning mechanism 4.

Figure 1:
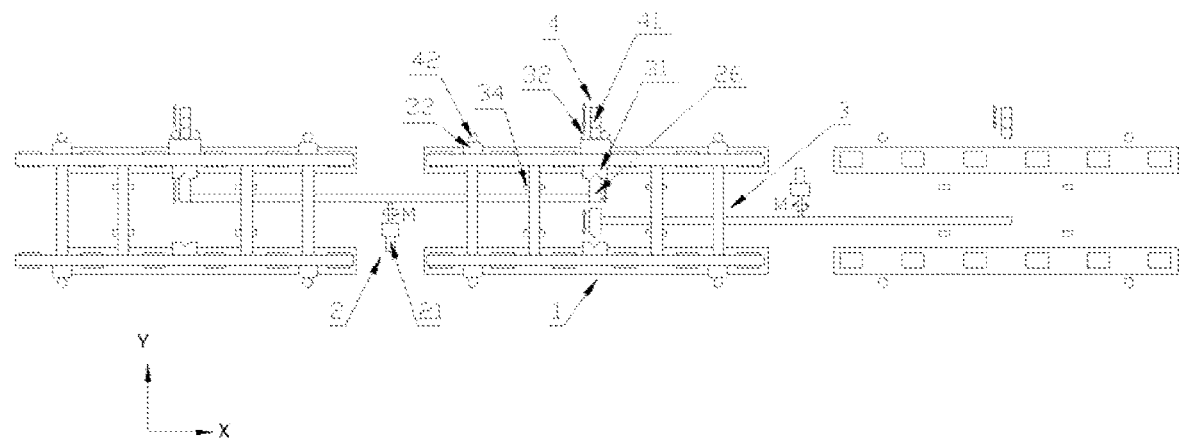
FIG. 1 is a schematic top view of an embodiment of the present disclosure.
Figure 2:
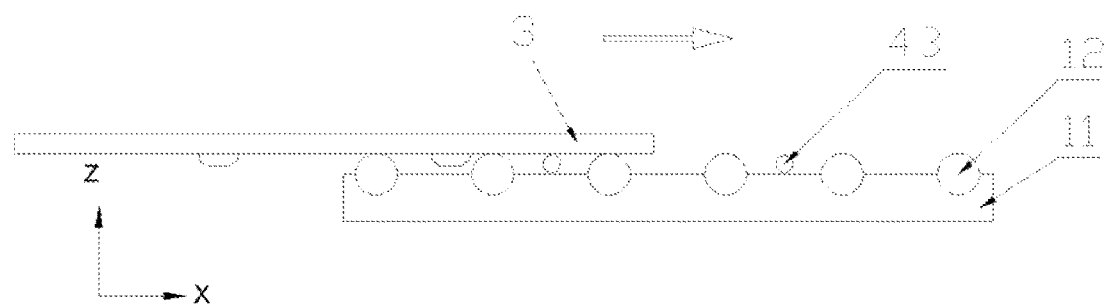
FIG. 2 is a schematic view illustrating a conveying carrier conveyed along a roller bed according to an embodiment shown in FIG. 1.
Figure 3:
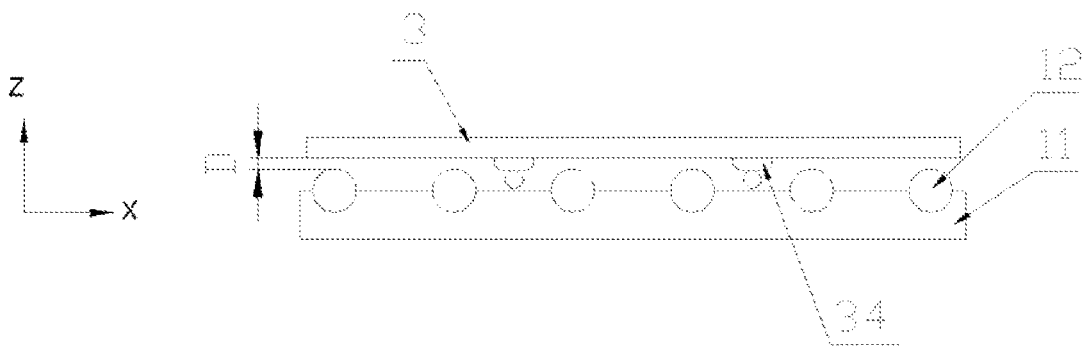
FIG. 3 is a schematic principle view illustrating a positioning in a Z direction according to an embodiment shown in FIG. 1.

Referring to FIG. 1, FIG. 2, and FIG. 3, the conveying carrier 3 is provided with a first connection structure 31, and the first connection structure 31 is configured to be cooperated with the driving mechanism, such that a workpiece is conveyed along the roller bed 1 under the action of the driving mechanism. A cooperation relationship between the first connection structure 31 and the driving mechanism will be described in detail below.

Referring to FIG. 1, FIG. 2, FIG. 3, and FIG. 5, in an embodiment of the present disclosure, the solution in which the roller bed 1 drives the conveying carrier 3 with frictional force in the prior art is abandoned, and an unpowered roller bed 1 is adopted as the roller bed 1. The roller bed 1 includes a roller bed base 11 and a plurality of rolling components 12. The rolling components 12 may be rollers, wheels, etc. The rolling components 12 are connected to the roller bed base 11, and the rolling components 12 support the conveying carrier 3 and are capable of rotating with the movement of the conveying carrier 3, which reduces the resistance of the conveying movement.

Figure 4:
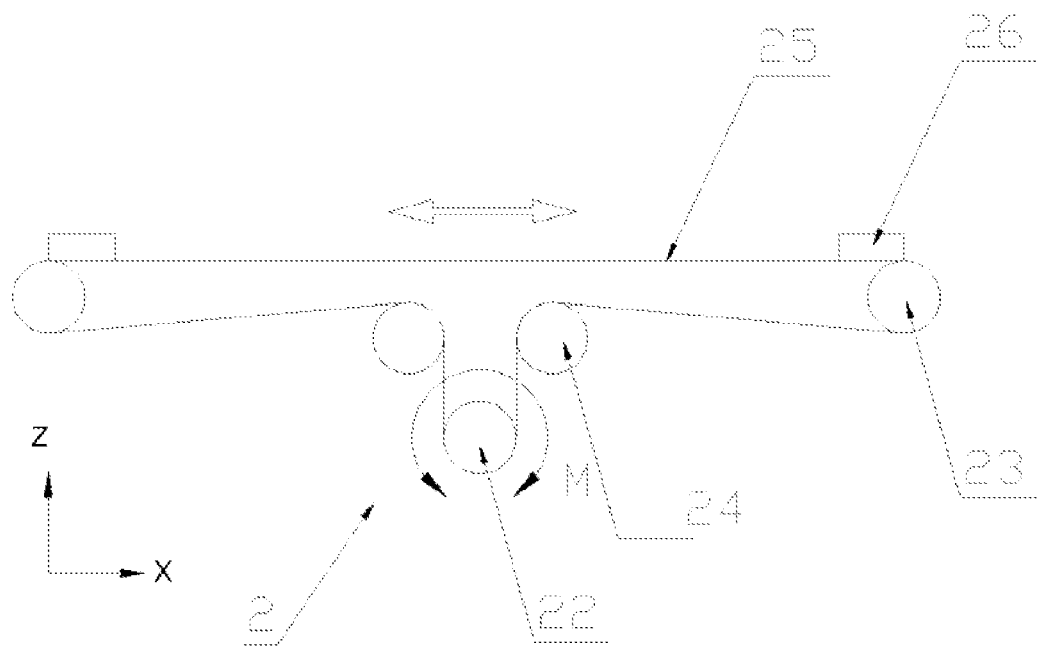
FIG. 4 is a schematic principle view illustrating a driving mechanism according to an embodiment shown in FIG. 1.
Figure 5:
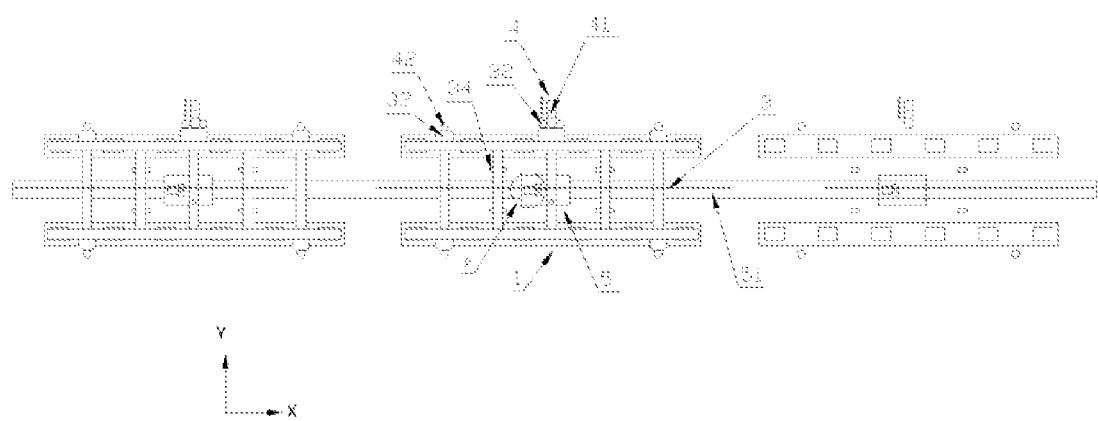
FIG. 5 is a schematic top view of another embodiment of the present disclosure.

Referring to FIG. 1, FIG. 4 and FIG. 5, the driving mechanism includes a second connection structure 26 and a driving assembly. The driving assembly may drive the second connection structure 26 to perform a reciprocating movement between the first position and the second position along a conveying direction, and the second connection structure 26 is connected to the first connection structure 31 at the first position, so as to transmit the power of the driving assembly to the conveying carrier 3. The second connection structure 26 is separated from the first connection structure 31 at the second position. The second position is located downstream of the first position in the conveying direction. The first connection structure 31 and the second connection structure 26 can be coupled, overlapped, and so on. The driving mechanism and the conveying carrier 3 are in a rigid contact formed by the first connection structure 31 and the second connection structure 26 along the conveying direction, which may avoid the problem that the conveying speed cannot be further improved in the traditional friction driving method because of the limitation of the friction limit, and can increase the conveying takt for the standard working station with a spacing of 6 meters from about 5 seconds to about 3 seconds.

Referring to FIG. 1 and FIG. 5, the positioning mechanism 4 is mounted at a working position corresponding to the conveying carrier 3. When the conveying carrier 3 is conveyed to the working position, the positioning mechanism 4 completes the positioning of the conveying carrier 3. The positioning mechanism 4 includes an X-direction positioning assembly, a Y-direction positioning assembly and a Z-direction positioning assembly. An X direction is parallel to the conveying direction, a Z direction is a height direction, and a Y direction is a left-right direction perpendicular to the X direction and the Z direction. The X-direction positioning assembly is configured to position the conveying carrier 3 at a working position in the X direction, the Y-direction positioning assembly is configured to position the conveying carrier 3 at the working position in the Y direction, the Z-direction positioning assembly is configured to position the conveying carrier 3 at the working position in the Z direction. The Z-direction positioning assembly lifts the conveying carrier 3 to disengage the conveying carrier from the rolling components.

An action execution logic of an embodiment of the present disclosure is as follows. When the conveying carrier 3 at the current working station is to be conveyed, the second connection structure 26 of the driving mechanism is in contact with the first connection structure 31 of the conveying carrier 3, and the driving mechanism performs an action to drive the conveying carrier 3 to be conveyed to the next working station, and the conveying carrier 3 is positioned by the positioning mechanism 4. Then the second connection structure 26 is disengaged from the first connection structure 31, and the driving mechanism performs an action in a reverse direction to drive the second connection structure 26 to return to the previous working station, and the second connection structure 26 waits for the next conveying carrier 3 to be conveyed, and this cycle is repeated.

Referring to FIG. 1, the driving mechanism may adopt a belt-type driving mechanism 2. Referring to FIG. 1 and FIG. 4, the driving mechanism includes a first driving component 21, a driving pulley 22, a driven pulley 23 and a synchronous belt 25. The first driving component 21 may adopt a driving element such as a motor. The driving pulley 22 is connected to an output end of the first driving component 21. The driving pulley 22 and the driven pulley 23 are connected in a transmission manner via the synchronous belt 25. The synchronous belt 25 extends along the conveying direction and is arranged across the working region. The second connection structure 26 is connected to the synchronous belt 25. In this embodiment, the reciprocating movement of the second connection structure 26 may be realized by the forward and reverse rotation of the motor.

When the conveying carrier 3 needs to be conveyed, the second connection structure 26 is in contact with the first connection structure 31, and the motor is rotated to drive the conveying carrier 3. After the conveying carrier 3 is conveyed to the working position for positioning, the second connection structure 26 is disengaged from the first connection structure 31, the motor is rotated in a reverse direction to return the second connection structure 26.

Further, referring to FIG. 4, the driven pulley 23 includes a first driven pulley 23 and a second driven pulley 23. The first driven pulley 23 and the second driven pulley 23 are arranged along the conveying direction and prop the synchronous belt 25 open, so that the synchronous belt 25 is arranged across the working region. The driving pulley 22 is located between the first driven pulley 23 and the second driven pulley 23, the driving pulley 22 and the motor is capable of deviating from the roller bed 1, so that the arrangement and maintenance of the driving pulley 22 and the motor are more flexible, and the space of the roller bed 1 is also effectively saved. In addition, both sides of the driving pulley 22 are provided with auxiliary pulleys 24 for guiding the synchronous belt 25. The auxiliary pulleys 24 are configured to ensure that the synchronous belt 25 is abutted against the driving pulley 22 to a certain extent, such that the driving pulley 22 is capable of driving the synchronous belt 25.

Referring to FIG. 1, the first connection structure 31 and the second connection structure 26 have abutted surfaces that are cooperated with each other, and the abutted surfaces are V-shaped or cylindrical, such that the first connection structure 31 and the second connection structure 26 may move relative to each other along the Z direction. During the positioning process in the Z direction, the second connection structure 26 and the first connection structure 31 may move relative to each other in the height direction along the V-shaped or cylindrical abutted surface therebetween.

In some implementations of the aforementioned embodiments, the second connection structure 26 is automatically separated from the first connection structure 31 during the positioning process in the Z direction, the motor is rotated in a reverse direction to return the second connection structure 26.

In some implementations of the aforementioned embodiments, referring to FIG. 1, the synchronous belt 25 is provided with a second driving component, and the second driving component may drive the second connection structure 26 to stretch out and draw back along the Y direction to be connected to or separated from the first connection structure 31. The motor is rotated in a reverse direction to return the second connection structure 26.

In some implementations of the aforementioned embodiments, referring to FIG. 1, the conveying system has a plurality of working positions along the conveying direction, and a plurality sets of belt-type driving mechanisms 2 are arranged along the conveying direction. Conveying ranges of two adjacent sets of belt-type driving mechanism are partially overlapped, that is, along the conveying direction, the second position of the previous set of belt-type driving mechanisms 2 is located downstream of the first position of the latter set of belt-type driving mechanisms 2, thereby realizing a relay-type conveying between a plurality of working stations.

Figure 6:
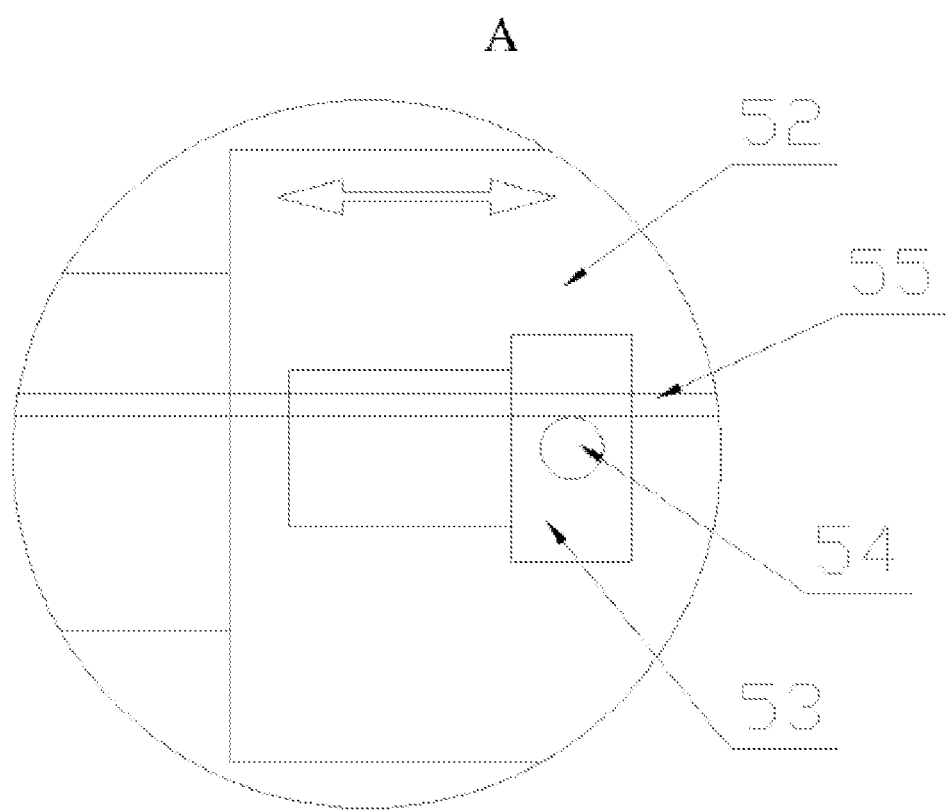
FIG. 6 is a partial enlarged view at A in FIG. 5.
Figure 7:
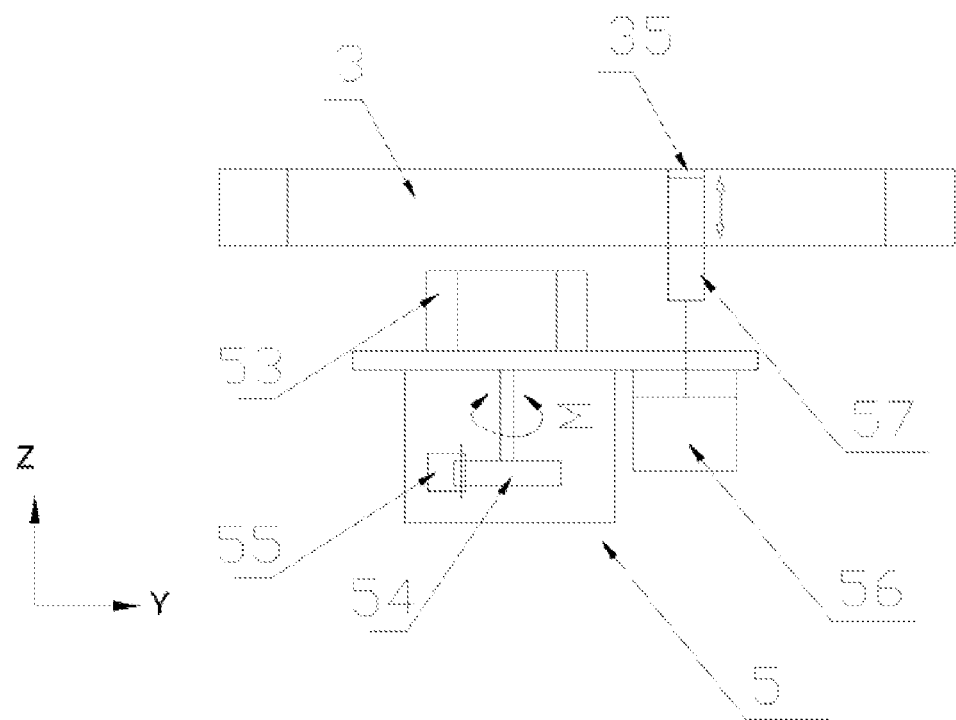
FIG. 7 is a schematic principle view illustrating a driving mechanism according to an embodiment shown in FIG. 5.

Referring to FIG. 5, the driving mechanism may adopt a sliding-type driving mechanism 5, referring to FIG. 5, FIG. 6, and FIG. 7, the driving mechanism includes a sliding seat 51, a rack 55, a mounting seat 52 and a third driving component 53. The rack 55 is connected to the sliding seat 51 and extends in the conveying direction. The mounting seat 52 and the sliding seat 51 are cooperated with each other via the guide assembly to realize a relative movement, and the second connection structure 26 is connected to the mounting seat 52. The third driving component 53 is connected to the mounting seat 52, an output end of the third driving component 53 is provided with a gear 54 cooperated with the rack 54. The third driving component 53 may adopt a driving element such as a motor. When the motor drives the gear 54 to rotate, under the action of the meshing transmission force, the mounting seat 52 may be driven to move, and the reciprocating movement can be realized by the forward and reverse rotation of the motor.

In some implementations of the aforementioned embodiments, the second connection structure 26 is automatically separated from the first connection structure 31 during the positioning process in the Z direction, the motor is rotated in a reverse direction to return the second connection structure 26.

In some implementations of the aforementioned embodiments, referring to FIG. 7, the first connection structure 31 includes a pin hole 35, the second connection structure 26 includes a pin 57 and further includes a fourth driving component 56. The fourth driving component 56 may adopt a driving element such as a cylinder. The fourth driving component 56 may drive the pin 57 to stretch out and draw back in the Z direction to be connected to or separated from the pin hole 35. When the conveying carrier 3 needs to be conveyed, the cylinder drives the pin 57 to stretch out, and the pin 57 is cooperated with the pin hole 35. At this time, the motor is rotated to drive the conveying carrier 3. After the conveying carrier 3 is conveyed to the working position for positioning, the cylinder drives the pin 57 to return, and the motor is rotated in the reverse direction at this time to return the pin 57.

When the conveying carrier 3 is conveyed to the working position, the positioning in the Y direction and the Z direction may be automatically positioned, the positioning in the X direction is performed after the delivery is in place.

Referring to FIG. 1 and FIG. 5, the X-direction positioning assembly includes an X-direction positioning wheel 32, an X-direction positioning block 41 and a fifth driving component, the X-direction positioning wheel 32 defines an X-direction positioning slot in the conveying carrier 3, and the fifth driving component may drive the X-direction positioning block 41 to extend into or retreat from the X-direction positioning slot. The fifth driving component may adopt a driving element such as a cylinder, and when the X-direction positioning assembly is extended, it is cooperated with the X-direction positioning wheel 32, that is, the positioning in the X direction is realized.

Referring to FIG. 1 and FIG. 5, the Y-direction positioning assembly includes a Y-direction positioning wheel 42 and a Y-direction positioning block 33. The Y-direction positioning wheels 42 are connected to the roller bed base 11 and are arranged on both sides of the conveying carrier 3 along the conveying direction. The Y-direction positioning block 33 is connected to the conveying carrier 3 to be cooperated with the Y-direction positioning wheel 42.

Referring to FIG. 2 and FIG. 3, the Z-direction positioning assembly includes a Z-direction positioning wheel 43 and a Z-direction positioning block 34. The Z-direction positioning wheel 43 is connected to the roller bed base 11 and is arranged below the conveying carrier 3 along the conveying direction. The Z-direction positioning block 34 is connected to the conveying carrier 3 to be cooperated with the Z-direction positioning wheel 43. When the conveying carrier 3 is not conveyed to be in contact with the positioning mechanism 4 during the conveying process, a bottom surface of the conveying carrier 3 is in contact with the roller. When the Z-direction positioning is realized, the conveying carrier 3 is separated from the roller to form a certain gap D, so as to realize the automatic precise positioning in the Z direction.

Of course, the present disclosure is not limited to the aforementioned embodiments, and those skilled in the art can also make equivalent modifications or replacements without departing from the spirit of the present disclosure, and these equivalent modifications or replacements are included within a range limited by the claims of the present disclosure.

What is claimed is:

1. A conveying system, comprising:
a conveying carrier provided with a first connection structure;
a roller bed comprising a roller bed base and a plurality of rolling components, wherein the rolling components are connected to the roller bed base, and the rolling components support the conveying carrier;
a driving mechanism comprising a second connection structure and a driving assembly, wherein the driving assembly is capable of driving the second connection structure to perform a reciprocating movement between a first position and a second position along a conveying direction, the second connection structure is connected to the first connection structure at the first position, and the second connection structure is separated from the first connection structure at the second position; and
a positioning mechanism comprising an X-direction positioning assembly, a Y-direction positioning assembly and a Z-direction positioning assembly, wherein the X-direction positioning assembly is configured to position the conveying carrier at a working position in an X direction, the Y-direction positioning assembly is configured to position the conveying carrier at the working position in a Y direction, the Z-direction positioning assembly is configured to position the conveying carrier at the working position in a Z direction, and the Z-direction positioning assembly lifts the conveying carrier to disengage the conveying carrier from the rolling components;
wherein the driving mechanism comprises a first driving component, a driving pulley, a driven pulley and a synchronous belt, the driving pulley is connected to an output end of the first driving component, the driving pulley and the driven pulley are connected in a transmission manner via the synchronous belt, the synchronous belt extends along the conveying direction, and the second connection structure is connected to the synchronous belt;

wherein the driven pulley comprises a first driven pulley and a second driven pulley, the first driven pulley and the second driven pulley are arranged along the conveying direction and prop the synchronous belt open, the driving pulley is located between the first driven pulley and the second driven pulley, and auxiliary pulleys configured to guide the synchronous belt are provided on both sides of the driving pulley.

2. The conveying system of claim 1, wherein the first connection structure and the second connection structure have abutted surfaces that are cooperated with each other, and the abutted surfaces are V-shaped or cylindrical, such that the first connection structure and the second connection structure can move relative to each other along the Z direction.

3. The conveying system of claim 2, wherein the synchronous belt is provided with a second driving component, and the second driving component is capable of driving the second connection structure to stretch out and draw back along the Y direction to be connected to or separated from the first connection structure.

4. The conveying system of claim 1, wherein the conveying system has a plurality of working positions along the conveying direction, a plurality sets of the driving mechanisms are arranged along the conveying direction, and conveying ranges of two adjacent sets of the driving mechanism are partially overlapped.

5. The conveying system of claim 1, wherein the X-direction positioning assembly comprises:
 an X-direction positioning wheel defining an X-direction positioning slot in the conveying carrier;
 an X-direction positioning block;
 a fifth driving component capable of driving the X-direction positioning block to extend into or retreat from the X-direction positioning slot.

6. The conveying system of claim 1, wherein the Y-direction positioning assembly comprises a Y-direction positioning wheel and a Y-direction positioning block, the Y-direction positioning wheels are connected to the roller bed base and are arranged along the conveying direction on both sides of the conveying carrier, the Y-direction positioning block is connected to the conveying carrier to be cooperated with the Y-direction positioning wheel; the Z-direction positioning assembly comprises a Z-direction positioning wheel and a Z-direction positioning block, the Z-direction positioning wheel is connected to the roller bed base and is arranged below the conveying carrier along the conveying direction, and the Z-direction positioning block is connected to the conveying carrier to be cooperated with the Z-direction positioning wheel.

7. A conveying system comprising:
 a conveying carrier provided with a first connection structure;
 a roller bed comprising a roller bed base and a plurality of rolling components, wherein the rolling components are connected to the roller bed base, and the rolling components support the conveying carrier;
 a driving mechanism comprising a second connection structure and a driving assembly, wherein the driving assembly is capable of driving the second connection structure to perform a reciprocating movement between a first position and a second position along a conveying direction, the second connection structure is connected to the first connection structure at the first position, and the second connection structure is separated from the first connection structure at the second position; and
 a positioning mechanism comprising an X-direction positioning assembly, a Y-direction positioning assembly and a Z-direction positioning assembly, wherein the X-direction positioning assembly is configured to position the conveying carrier at a working position in an X direction, the Y-direction positioning assembly is configured to position the conveying carrier at the working position in a Y direction, the Z-direction positioning assembly is configured to position the conveying carrier at the working position in a Z direction, and the Z-direction positioning assembly lifts the conveying carrier to disengage the conveying carrier from the rolling components;
 wherein the driving mechanism comprises:
 a sliding seat;
 a rack connected to the sliding seat and extending along the conveying direction;
 a mounting seat cooperated with the sliding seat via a guiding assembly, wherein the second connection structure is connected to the mounting seat;
a third driving component connected to the mounting seat, wherein an output end of the third driving component is provided with a gear cooperated with the rack.

8. The conveying system of claim 7, wherein the first connection structure comprises a pin hole, the second connection structure comprises a pin and further comprises a fourth driving component, and the fourth driving component is capable of driving the pin to stretch out and draw back in the Z direction to be connected to or separated from the pin hole.

\* \* \* \* \*